H. T. DETERT.
Collar-Pads.

No. 218,944.  Patented Aug. 26, 1879.

WITNESSES:
C. Neveux
C. Sedgwick

INVENTOR:
H. T. Detert
BY Munn & Co
ATTORNEYS.

UNITED STATES PATENT OFFICE.

HERMAN T. DETERT, OF FARIBAULT, MINNESOTA.

IMPROVEMENT IN COLLAR-PADS.

Specification forming part of Letters Patent No. 218,944, dated August 26, 1879; application filed July 19, 1879.

*To all whom it may concern:*

Be it known that I, HERMAN THEODORE DETERT, of Faribault, in the county of Rice and State of Minnesota, have invented a new and useful Improvement in Collar-Pads, of which the following is a specification.

Figure 1:
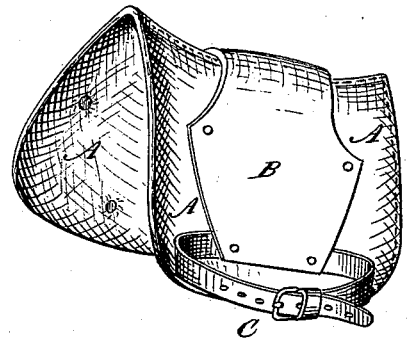
Figure 2:
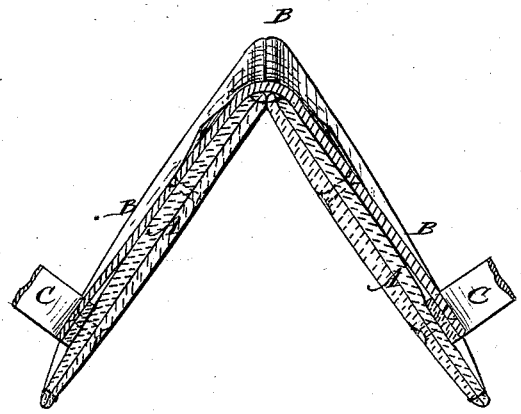

Figure 1 is a perspective view of one of my improved pads. Fig. 2 is a vertical cross-section of the same.

Similar letters of reference indicate corresponding parts.

The object of this invention is to furnish an improved pad for horse-collars which shall be so constructed as not to rest upon the top of the horse's neck, so as to prevent the neck from being made sore, and allow it to heal if previously injured, and which will allow air to circulate between it and the top of the horse's neck, to prevent the said neck from becoming unduly heated or being scalded.

The invention consists in the angular iron plate having the front and rear parts of its middle or angular part cut away, in combination with the pad and the fastening-straps, as hereinafter fully described.

A is a leather pad of suitable shape and size to be placed within the upper end of a horse-collar, and which is riveted to the iron plate B. The plate B is struck up into angular or V form, and has the front and rear part of the middle part cut away, as shown in Fig. 1, to allow the front and rear edges of the pad A to turn up, and thus be prevented from injuring the horse's neck. The angle of the plate B is such that the sides or wings of the pad will rest upon the sides of the upper part of the horse's neck, leaving a space between the top of the neck and the pad, so that air may circulate freely, and prevent the neck from being too much heated. The plate B is made of such a length that the rivets that fasten the ends of its wings to the pad A may also fasten the straps C, that buckle around the collar and secure the pad to it.

Having thus fully described my invention, I claim as new and desire to secure by Letters Patent—

The angular plate B, having the front and rear parts of its middle or angular part cut away, in combination with the pad A and fastening-straps C, substantially as herein shown and described.

HERMAN THEODORE DETERT.

Witnesses:
 WILLIAM S. MORSE,
 THS. MEE.